(12) United States Patent (10) Patent No.: US 8,989,504 B2
Suzuki (45) Date of Patent: Mar. 24, 2015

(54) IMAGE PROCESSING DEVICE THAT RENEWS IDENTIFICATION INFORMATION OF SPECIFIC SUBJECT

(75) Inventor: Shigeto Suzuki, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 319 days.

(21) Appl. No.: 13/615,338

(22) Filed: Sep. 13, 2012

(65) Prior Publication Data

US 2013/0077874 A1 Mar. 28, 2013

(30) Foreign Application Priority Data

Sep. 28, 2011 (JP) ................................. 2011-211967

(51) Int. Cl.
| | |
|---|---|
| G06K 9/64 | (2006.01) |
| H04N 5/232 | (2006.01) |
| H04N 1/00 | (2006.01) |
| G06K 9/00 | (2006.01) |
| G06K 9/62 | (2006.01) |
| H04N 101/00 | (2006.01) |

(52) U.S. Cl.
CPC ....... *H04N 5/23219* (2013.01); *H04N 1/00336* (2013.01); *G06K 9/00288* (2013.01); *G06K 9/6255* (2013.01); *H04N 2101/00* (2013.01); *H04N 2201/0084* (2013.01)
USPC ............ 382/218; 382/118; 382/209; 382/224

(58) Field of Classification Search
CPC .......... G06K 9/00288; G06K 9/00221; G06K 9/00771; G06K 9/6807
USPC ................... 382/218, 118, 224, 209
See application file for complete search history.

(56) References Cited

U.S. PATENT DOCUMENTS

| 8,311,293 B2 * | 11/2012 | Okada ........................... 382/118 |
| 2006/0271525 A1 * | 11/2006 | Sukegawa ......................... 707/3 |
| 2008/0253662 A1 * | 10/2008 | Funaki et al. ................. 382/209 |

(Continued)

FOREIGN PATENT DOCUMENTS

| JP | 2007-282119 A | 10/2007 |
| JP | 2008102770 A | 5/2008 |
| JP | 2009110147 A | 5/2009 |

OTHER PUBLICATIONS

Japanese Office Action dated Nov. 25, 2014, issued in counterpart Japanese Application No. 2011-211967.

*Primary Examiner* — Stephen R Koziol
*Assistant Examiner* — Shaghayegh Azima
(74) *Attorney, Agent, or Firm* — Holtz, Holtz, Goodman & Chick PC

(57) ABSTRACT

An image pickup device includes an image acquiring unit, calculating unit, memory controlling unit, first judging unit and notification unit.
The calculating unit calculates a degree of similarity between information of a specific subject contained in the image acquired by the acquiring unit and identification information of the specific subject registered in a registering unit.
The memory controlling unit controls a memory unit to store the calculated degree of similarity such that the degree of similarity is associated with date/time information.
The first judging unit judges whether the calculated degree of similarity is relatively low compared with predetermined number of other degrees of similarity based on a chronological change of the degrees of similarity.
The notification unit notifies that the identification information registered in the registering unit is to be renewed when judged, by the first judging unit, that the calculated degree of similarity is relatively low.

17 Claims, 7 Drawing Sheets

(56) References Cited

U.S. PATENT DOCUMENTS

| | | | |
|---|---|---|---|
| 2011/0052074 A1* | 3/2011 | Hayaishi | 382/190 |
| 2013/0039590 A1* | 2/2013 | Yoshio | 382/218 |
| 2013/0063581 A1* | 3/2013 | Komatsu et al. | 348/77 |
| 2013/0236071 A1* | 9/2013 | Ishikawa et al. | 382/118 |

* cited by examiner

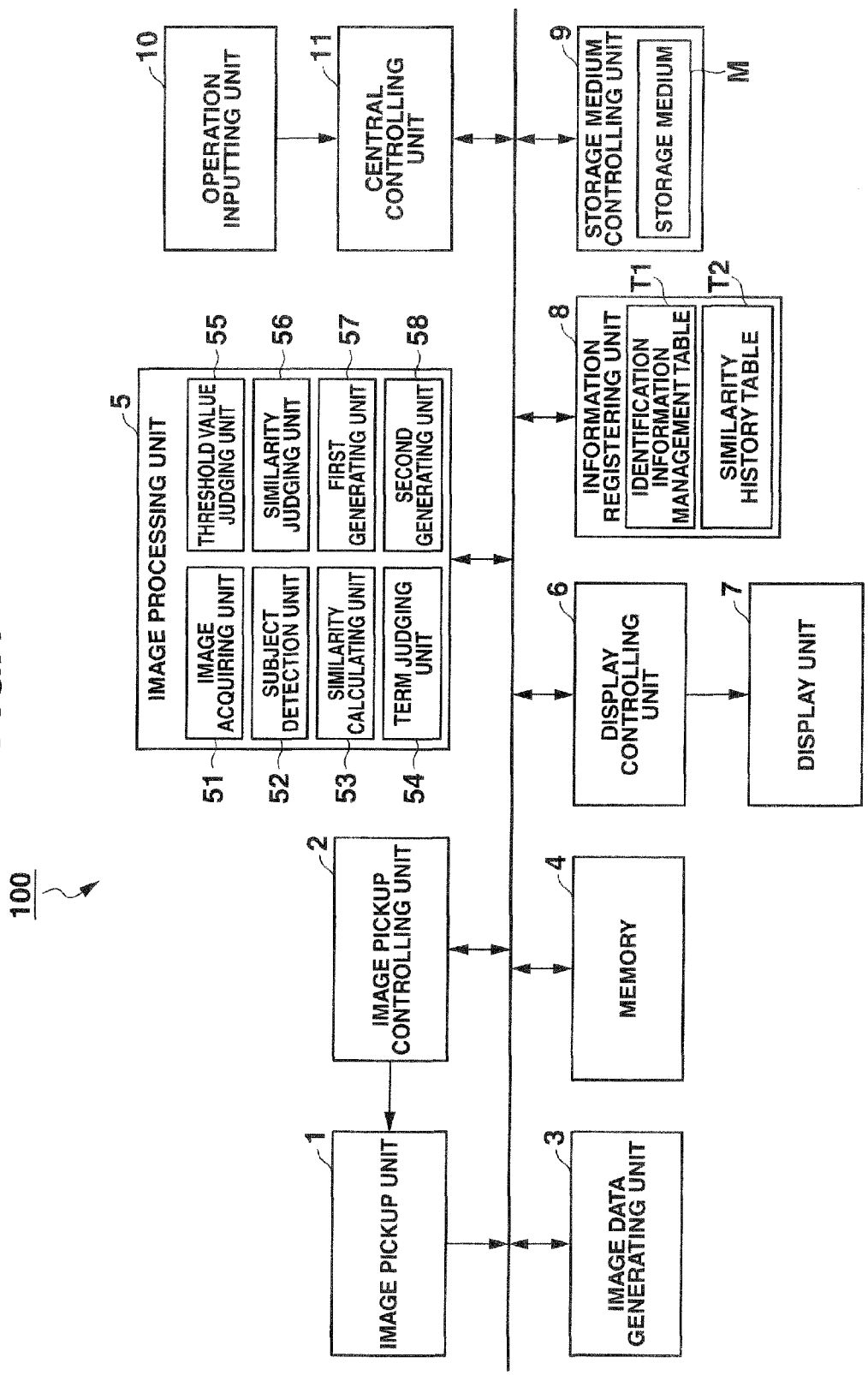

FIG.2A
| NAME | IDENTIFICATION INFORMATION | REGISTRATION DATE/TIME |
|---|---|---|
| MR. A | IDENTIFICATION INFORMATION A1 | 12/24/2008 |
| MR. B | IDENTIFICATION INFORMATION B | 7/7/2009 |
| MR. C | IDENTIFICATION INFORMATION C | 5/5/2010 |
| ⋮ | ⋮ | ⋮ |
T1
FIG.2B
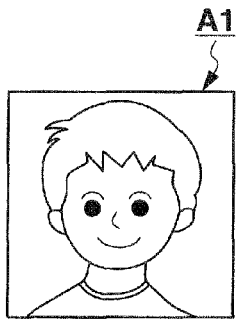
A1
FIG.2C
| NAME | IDENTIFICATION INFORMATION | REGISTRATION DATE/TIME |
|---|---|---|
| MR. A | IDENTIFICATION INFORMATION A2 | 6/1/2011 |
| MR. B | IDENTIFICATION INFORMATION B | 7/7/2009 |
| MR. C | IDENTIFICATION INFORMATION C | 5/5/2010 |
| ⋮ | ⋮ | ⋮ |
T1
FIG.2D
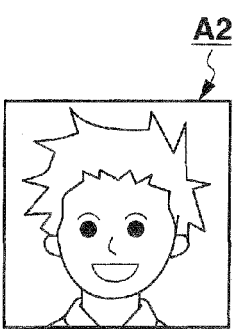
A2

| NAME | IMAGE PICKUP DATE/TIME | DEGREE OF SIMILARITY (%) | SPECIFIC REGION DATA |
|---|---|---|---|
| MR. A | 12/24/2008 | 100 | FACE REGION DATA A1 |
| MR. A | 1/1/2009 | 95 | FACE REGION DATA A2 |
| MR. A | 2/3/2009 | 65 | FACE REGION DATA A3 |
| MR. A | 3/23/2009 | 93 | FACE REGION DATA A4 |
| MR. A | 5/5/2009 | 94 | FACE REGION DATA A5 |
| MR. B | 7/7/2009 | 100 | FACE REGION DATA B1 |
| ⋮ | ⋮ | ⋮ | ⋮ |
| MR. A | 1/3/2011 | 80 | FACE REGION DATA An-5 |
| MR. A | 3/3/2011 | 73 | FACE REGION DATA An-4 |
| MR. A | 3/5/2011 | 74 | FACE REGION DATA An-3 |
| MR. A | 5/5/2011 | 72 | FACE REGION DATA An-2 |
| MR. A | 5/15/2011 | 71 | FACE REGION DATA An-1 |
| MR. A | 6/1/2011 | 68 | FACE REGION DATA An |
| ⋮ | ⋮ | ⋮ | ⋮ |

IMAGE PROCESSING DEVICE THAT RENEWS IDENTIFICATION INFORMATION OF SPECIFIC SUBJECT

BACKGROUND OF THE INVENTION

1. Field of the Invention

The present invention relates to an image processing device, an image processing method and a storage medium.

2. Description of Related Art

Japanese Patent Document (JP2007-282119A), for example, discloses a conventional technique to judge whether or not a newly captured face region matches to a subject to be recognized based on a previously registered data and corresponding features in the face region.

SUMMARY OF THE INVENTION

According to a first aspect of the present invention, an image processing device is provided, which includes:

an acquiring unit that acquires an image;

a calculating unit that calculates a degree of similarity between information of a specific subject contained in the image acquired by the acquiring unit and identification information of the specific subject registered in a registering unit;

a memory controlling unit that controls a memory unit to store the calculated degree of similarity such that the degree of similarity is associated with date/time information;

a first judging unit that judges whether or not the calculated degree of similarity is relatively low compared with predetermined number of other degrees of similarity based on a chronological change of the degrees of similarity; and a notification unit that notifies that the identification information registered in the registering unit is to be renewed when judged, by the first judging unit, that the calculated degree of similarity is relatively low.

Preferably, the memory controlling unit controls the memory unit, every time the degree of similarity is calculated by the calculating unit, to store the calculated degree of similarity such that the calculated degree of similarity is associated with date/time information.

According to a second aspect of the present invention, an image processing method utilizing an image processing device includes following steps of:

acquiring an image;

calculating a degree of similarity between information of a specific subject contained in the acquired image and identification information of the specific subject registered in a registering unit;

storing the calculated degree of similarity in a memory unit such that the degree of similarity is associated with date/time information;

judging, based on a chronological change of degrees of similarity, whether or not the calculated degree of similarity is relatively low compared with predetermined number of degrees of similarity other than the calculated degree of similarity; and notifying that the identification information registered in the registering unit is to be renewed when the calculated degree of similarity is judged to be relatively low.

Preferably, the image processing device is provided with a registering unit that registers identification information to identify a specific subject and registration date/time information of the identification information such that they are associated with each other.

According to a third aspect of the present invention, a computer readable program storage medium that stores a program is provided, the program includes:

operational instructions that cause the computer to acquire an image;

operational instructions that cause the computer calculate a degree of similarity between information of a specific subject contained in the acquired image and identification information of the specific subject registered in a registering unit;

operational instructions that cause the computer to store the calculated degree of similarity in a memory unit such that the degree of similarity is associated with date/time information;

operational instructions that cause the computer to judge, based on a chronological change of degrees of similarity, whether or not the calculated degree of similarity is relatively low compared with predetermined number of degrees of similarity other than the calculated degree of similarity; and operational instructions that cause the computer to notify that the identification information registered in the registering unit is to be renewed when the calculated degree of similarity is judged to be relatively low.

BRIEF DESCRIPTION OF THE DRAWINGS

FIG. 1 is a schematic block diagram of an image pickup (capturing) device that applies an exemplary embodiment of the present invention, FIGS. 2A to 2D are schematic examples of an identification information managing table stored in the image pickup device in FIG. 1, FIG. 3 is a schematic example of a similarity history table stored in the image pickup device in FIG. 1.

DETAILED DESCRIPTION OF PREFERRED EMBODIMENTS

Figure 4:
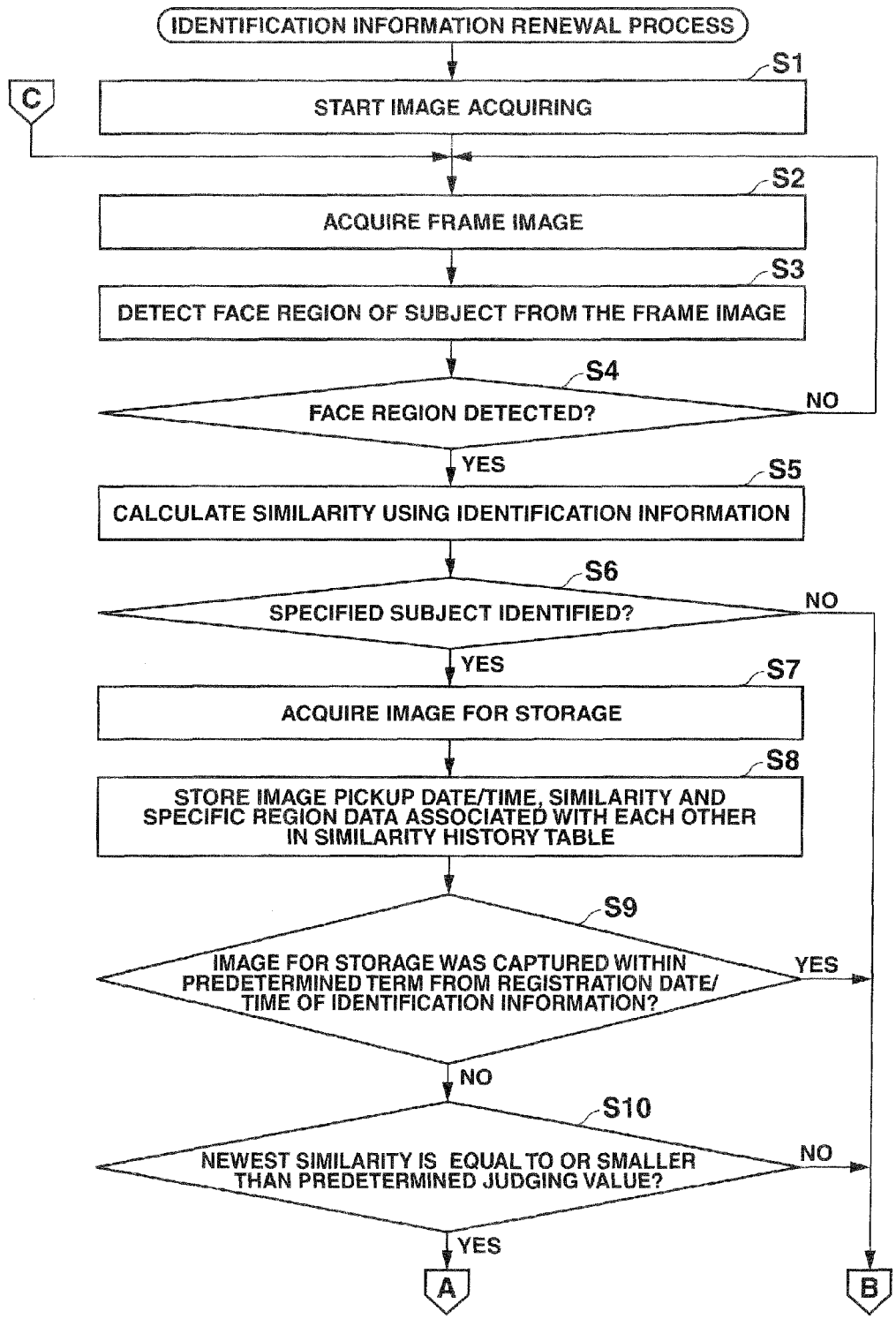
FIG. 4 is a flowchart of an example of an identification information renewal process by the image pickup device in FIG.

Exemplary embodiments of the present invention will be explained by way of examples with reference to the drawings. It is not intended to limit the invention to the embodiments.

FIG. 1 is a schematic block diagram of a structure of an image pickup (capturing) device 100 that applies an exemplary embodiment of the present invention.

The image pickup device 100 of an embodiment calculates "a degree of similarity" (simply designated as "a similarity" hereinafter) between information of a subject (individual) contained in an obtained image and identification information to identify a specific subject (individual) and stores the similarity so as to be associated with predetermined date and/or time (date/time) information every time a similarity is calculated. The image pickup device 100 judges whether or not the newly calculated similarity was relatively decreased (is relatively low) compared with predetermined number of similarities (degrees of similarity, hereinafter the same) other than the newly calculated similarity and when judged that the similarity was relatively decreased (is relatively low), the image pickup device 100 notifies that the registered identification information is to be renewed (updated).

Specifically, as shown in FIG. 1, the image pickup device 100 is provided with am image pickup unit 1, image pickup controlling unit 2, image data generating unit 3, memory 4, image processing unit 5, display controlling unit 6, display unit 7, information registering unit 8, storage medium controlling unit 9, operation inputting unit 10 and central controlling unit 11.

The image pickup unit 1, as an image pickup means, captures a subject image (human face, for example) and generates a frame image. Specifically, the image pickup unit 1 is composed of a lens unit composed of multiple lenses such as a zoom lens, focusing lens and the like, an aperture to adjust an amount of light passing through the lens unit and an image sensor such as a CCD (Charge Coupled Device), CMOS (Complementary Metal-Oxide Semiconductor) or the like, and provided with an electronic imaging unit to convert an optical image through the lens unit into two dimensional image signals, for example (all not shown).

The image pickup unit 1 may be provided with a zoom lens activating unit to shift the zoom lens along an optical axis or a focusing lens activating unit to shift the focusing lens along the optical axis.

The image pickup controlling unit 2 controls image pickup of a subject by the image pickup unit 1. The image pickup controlling unit 2 is provided with a timing generator, driver and the like (not shown). The image pickup controlling unit 2 drives to scan the electronic imaging unit using the timing generator and the driver so as to convert an optical image into two dimensional electronic signals by the electronic imaging unit every predetermined period, read the frame images frame by frame and output them to the image data generating unit 3.

The image pickup controlling unit 2 may control the electronic imaging unit to shift along the optical axis so as to adjust the focusing point instead of shifting the focusing lens of the lens unit.

The image pickup controlling unit 2 may control and adjust imaging conditions for a subject such as an automatic exposure (AE), automatic white balancing (AWB) and the like as well as the automatic focusing (AF).

The image data generating unit 3 adjusts gains for RGB color components of the analog signals of the frame image transmitted from the electronic imaging unit, holds a sample by a sample/hold circuit (not shown) and convert it into digital data by an A/D converter (not shown), performs color processing including a pixel interpolation processing and a gamma correction processing using a color processing circuit (not shown) and generates a luminance signal Y and color difference signals Cb, Cr (YUV data) of the digital values.

The luminance signal Y and the color difference signals Cb, Cr output from the color processing circuit are transferred to the memory 4 as a buffer memory by DMA via DMA controller (not shown).

The memory 4 is composed of a DRAM (Dynamic Random Access Memory), for example, and temporarily stores data to be processed by the image processing unit 5 or the central controlling unit 11.

The image processing unit 5 is provided with an image acquiring unit 51, subject detection unit 52, similarity calculating unit 53, term judging unit 54, threshold value judging unit 55, similarity judging unit 56, first generating unit 57 and second generating unit 58.

Each unit of the image processing unit 5 is composed of a specific logic circuit, for example. However, the structure is an example and not restrictive.

The image acquiring unit 51 acquires an image to be processed by an identification information renewal process which will be explained later.

That is, the image acquiring unit 31 acquires an image data of the image picked up by the image pickup unit 1 as an image to be processed by the identification information renewal process. Specifically, the image acquiring unit 51 acquires an image data (YUV data), from the memory 4 one by one, of the each frame image generated by the image data generating unit 3 based on the subject image picked up by the image pickup unit 1.

The image acquiring unit 51 acquires images by the manner as explained above.

The subject detection unit 52 detects a subject contained in the image to be processed.

That is, the subject detection unit 52 detects a specific region (face region S, for example, see FIG. 6A) containing a subject such as human or an animal in the each frame image acquired by the image acquiring unit 51 using an image recognition techniques such as a face detection process, edge detection process, feature extraction process or the like. Specifically, the subject detection unit 52 performs predetermined face detection process on an image data of the each frame image and detects a face region S of a subject of human or an animal in the frame image.

The face detection process, edge detection process and feature extraction process are known arts and thus detailed explanations are omitted.

The subject detection unit 52 detects a subject contained in the image acquired by the image acquiring unit 51 by the manner as explained above.

The similarity calculating unit 53 calculates a similarity between information of a subject contained in the image to be processed and identification information.

That is, the similarity calculating unit 53 calculates a similarity between information of a subject in a specific region (face region S, for example) detected by the subject detection unit 52 in the frame image acquired by the image acquiring unit 51 and identification information registered in an identification information management table T1 (see FIG. 2A, for example) in the information registering unit 8. Specifically, the similarity calculating unit 53 acquires identification information for a specific subject from the identification information management table T1, check each of the identification information against the face region S of the subject detected by the subject detection unit 52 and calculates the similarity between them in percent according to a predetermined calculation equation. The similarity calculating unit 53 determines one similarity that is equal to or larger than a predetermined threshold value (60%, for example) and the best one among the calculated similarities as the similarity between the subject information detected by the subject detection unit 52 and the identification information.

As a result, the subject detected by the subject detection, unit 52 can be recognized as the specific subject (as "Mr. A", for example) corresponding to the identification information ("identification information A1", for example) having the best similarity calculated by the similarity calculating unit 53.

The similarity calculating unit 53 calculates the similarity between subject information contained in the image acquired by the image acquiring unit 51 and identification information registered in the information registering unit 8 by the manner as explained above.

The term judging unit 54 judges whether or not an image P for storage (see FIG. 6A) having a similarity newly calculated by the similarity calculating unit 53 is an image captured within a predetermined term from a registered date and time of the identification information.

That is, the term judging unit 54 judges whether or not the image P for storage relating to the similarity newly calculated by the similarity calculating unit 53 is captured within a predetermined term (within two years, for example) from a registered date/time of the identification information based on specific date/time information (image pickup date/time information, for example) that is associated with the similarity newly calculated by the similarity calculating unit 53. Specifically, when a similarity is newly calculated by the similarity calculating unit 53, the term judging unit 54 acquires image pickup date/time information of the image P for storage which is stored in connection with the newly calculated similarity by referring to a similarity history table T2 (see FIG. 3) in the information registering unit 8. The term judging unit 54 also acquires registration date/time information of the identification information ("identification information A1", for example) of the specific subject ("Mr. A", for example) corresponding to the similarity by referring to the identification information management table T1 in the information registering unit 8. The term judging unit 54 then judges whether or not the image P for storage is captured within the predetermined term from the registration date/time of the identification information by comparing the pickup date/time of the image P for storage with the registration date/time of the identification information.

The term judging unit 54 acquires image pickup date/time information using a similarity history table T2 in this embodiment. However, the method for acquiring image pickup date/time information is an example and not restrictive. For example, image pickup date/time information may be obtained by referring to Exif information of an image whose similarity is calculated by the similarity calculating unit 53.

The term judging unit 54 judges whether or not the image having a similarity, which is newly calculated by the similarity calculating unit 53, is captured within a predetermined term from the registration date/time of the identification information based on the specific date/time information associated with the calculated similarity by the manner as explained above.

The threshold value judging unit 55 judges whether or not the similarity is equal to or lower than a predetermined judging value.

That is, the threshold value judging unit 55 judges whether or not the similarity newly calculated by the similarity calculating unit 53 is equal to or lower than a predetermined judging value. Specifically, when the term judging unit 54 judged that the image P for storage was picked up within a predetermined term from the registration date/time of the identification information, the threshold value judging unit 55 judges whether or not the newest similarity of the image P for storage is equal to or lower than a predetermined judging value (70%, for example).

The predetermined judging value of 70% is an example and the value is arbitrarily chosen. That is, the predetermined judging value may be set by a user through the operation inputting unit 10 as desired. Or the value may be automatically decreased according to a lapse of term from the registration date/time registered in the identification information management table T1.

The threshold value judging unit 55 judges whether or not the similarity calculated by the similarity calculating unit 53 is equal to or lower than a predetermined judging value by the manner as explained above.

The similarity judging unit 56 judges whether or not a similarity was relatively decreased.

That is, the similarity judging unit 56 judges whether or not the similarity newly calculated by the similarity calculating unit 53 was relatively decreased compared with predetermined number of similarities other than the similarity based on chronological change of the multiple similarities stored in the similarity history table T2 in the information registering unit 8. Specifically, when a similarity is newly calculated by the similarity calculating unit 53, the similarity judging unit 56 acquires multiple image pickup date/time information corresponding to images stored in connection with the calculated similarity and other predetermined number of similarities by referring to the similarity history table T2. The similarity judging unit 56 specifies chronological change of the multiple similarities based on the acquired multiple image pickup date/time information. After that the similarity judging unit 56 judges whether or not the calculated similarity was relatively decreased compared with the other predetermined number of similarities based on the chronological change.

The chronological change of the multiple similarities means a tendency of relative change of the similarities with a progress of the image pickup date/time. The chronological change of the multiple similarities is specified by comparing with the similarity the image pickup timing of which is previous by predetermined number (one, for example). The chronological change of the multiple similarities has a tendency to decrease relatively or increase relatively with a progress of the image pickup date/time.

The similarity judging unit 56 judges whether the multiple similarities have a tendency to decrease relatively with a progress of the image pickup date/time.

Specifically, for example, the similarity judging unit 56 judges whether or not the similarities have a tendency to decrease relatively in the following manner. At first, the similarity judging unit 56 selects the similarity calculated by the similarity calculating unit 53 and predetermined number (three, for example) of similarities having nearer image pickup date/time to the calculated similarity. The similarity judging unit 56 then judges whether each of the similarities was decreased compared with the similarity having the just previous image pickup date/time. That is, in a case where each of the similarities was judged as decreased compared with the just previous similarity, the similarity judging unit 56 judges that the multiple similarities have the tendency to decrease relatively. On the other hand, in a case where each of the similarities was judged not decreased compared with the just previous similarity, the similarity judging unit 56 judges that the multiple similarities have no tendency to decrease relatively.

The similarity judging unit 56 may judge whether or not the similarities have a tendency to decrease relatively by judging whether the similarity calculated by the similarity calculating unit 53 was decreased compared with the similarity of the just previous image pickup date/time and each of specified number (three, for example) of similarities among predetermined number (five, for example) of similarities was decreased compared with the similarity of the just previous image pickup date/time. That is, in a case where the calculated similarity was judged as decreased compared with the just previous similarity and each of the specified number of similarities was judged as decreased compared with the just previous similarity, the similarity judging unit 56 judges that the multiple similarities have the tendency to decrease relatively. On the other hand, in a case where the calculated similarity was judged not decreased compared with the just previous similarity or each of the specified number of similarities was judged not decreased compared with the just previous similarity, the similarity judging unit 56 judges that the multiple similarities have no tendency to decrease relatively.

The judgment methods above explained to judge whether the similarities have a tendency to decrease relatively are examples and appropriate modifications are applicable.

After that the similarity judging unit 56 judges whether or not the calculated similarity was relatively decreased compared with the other predetermined number of similarities according to the judgment result whether the multiple similarities have a tendency to decrease relatively with a progress of the image pickup date/time.

That is, in a case where it is judged that the multiple similarities have a tendency to decrease relatively, the similarity judging unit 56 judges that the calculated similarity was relatively decreased compared with the other predetermined number of similarities. On the other hand, in a case where it is judged that the multiple similarities have no tendency to decrease relatively, the similarity judging unit 56 judges that the calculated similarity is not relatively decreased compared with the other predetermined number of similarities.

The similarity judging unit 56 may judge whether or not the calculated similarity was relatively decreased compared with the other predetermined number of similarities in a case where the term judging unit 54 judged that the image relating to the similarity was not captured within a predetermined term (two years, for example).

Or the similarity judging unit 56 may judge whether or not the calculated similarity was relatively decreased compared with the other predetermined number of similarities in a case where the threshold value judging unit 55 judged that the similarity was not greater than a predetermined judgment value (70%, for example).

The similarity judging unit 56 may obtain the similarity newly calculated by the similarity calculating unit 53 before the similarity is stored in the similarity history table T2 and judge whether the similarity was relatively decreased or not.

By the manner as explained above, the similarity judging unit 56 judges whether a similarity newly calculated by the similarity calculating unit 53 was relatively decreased compared with other predetermined number of similarities based on a chronological change of multiple similarities stored in the similarity history table T2 of the information registering unit 8.

The first generating unit 57 newly generates identification information to identify a specific subject when identification information is renewed by a predetermined operation of the operation inputting unit 10 by a user.

That is, when multiple similarities and images of a specific subject are displayed associated with each other on the display unit 7, the first generating unit 57 newly generates identification information ("identification information A1" for "Mr. A", for example) based on the image of the specific subject selected by a predetermined operation of the operation inputting unit 10 by a user. Specifically, when an image of a specific subject is selected by a predetermined operation of the operation inputting unit 10 by a user, the first generating unit 57 refers to the similarity history table T2 of the information registering unit 8. The first generating unit 57 obtains, based on the reference result, specific region data (face region data An, for example) corresponding to the image of the specific subject and defines the specific region data as the identification information ("identification information A2", for example).

A plurality of images may be selected by a predetermined operation of the operation inputting unit 10 by a user. In such a case, the first generating unit 57 may obtain multiple specific region data corresponding to the multiple images of the specific subject and may define one specific region data based on the multiple specific region data. That is, the first generating unit 57 may define a specific region data having a representative similarity (median value, mean value, mode value, or the like) among the multiple specific region data. Or the first generating unit 57 may generate a specific region data by changing weights of the multiple specific region data according to predetermined conditions and merging them.

By the manner as explained above, the first generating unit 57 newly generates identification information for identifying a specific subject, among multiple similarities and images of the specific subject displayed on the display unit 7 such that they are associated with each other, based on (an) image(s) of the specific subject selected by a predetermined operation of the operation inputting unit 10 by a user.

The second generating unit 58 newly generates identification information to identify a specific subject when identification information is renewed automatically.

That is, in a case where the similarity judging unit 56 judged that a similarity was relatively decreased, the second generating unit 58 newly generates identification information to identify a specific subject ("identification information A1" for "Mr. A", for example) based on an image of the subject contained in an image related to the similarity. Specifically, the second generating unit 58 obtains, with reference to the similarity history table T2 of the information registering unit 8, a specific region data (face region data An, for example) stored associated with the similarity. After that the second generating unit 58 specifies the specific region data as the identification information ("identification information A2", for example).

The second generating unit 58 may obtain predetermined number of specific region data, as well as the specific region data corresponding to the similarity, that are related to similarities close to (within 5% of difference, for example) the similarity and define a specific region data based on the multiple specific region data. That is, the second generating unit 58 may define a specific region data having a representative similarity (median value, mean value, mode value, or the like) among the multiple specific region data. Or the second generating unit 58 may generate a specific region data by changing weights of the multiple specific region data according to predetermined conditions and merging them.

By the manner as explained above, in a case where identification information is renewed automatically, the second generating unit 58 newly generates identification information for identifying a specific subject based on an image of the subject contained in an image related to a similarity which the similarity judging unit 56 judged that the similarity was relatively decreased.

The display controlling unit 6 controls such that an image data for display, which is temporarily stored in the memory 4, is read and displayed on the display unit 7.

Specifically, the display controlling unit 6 is provided with a VRAM (Video Random Access Memory), VRAM controller, digital video encoder, and the like. The digital video encoder periodically reads luminance signal Y and color difference signals Cb and Cr, which are read from the memory 4 and stored in the VRAM (not shown) by the control of the central controlling unit 11, from the VRAM by the VRAM controller, generates video signals based on the data and outputs them to the display unit 7.

The display unit 7 is a liquid display panel, for example, and can display images captured by the electronic image pickup unit based on the video signals from the display controlling unit 6. Specifically, the display unit 7 displays live view images by renewing multiple frame images, which are acquired by the image pickup unit 1 and the image pickup controlling unit 2 in a still image pickup mode or a moving image pickup mode, in predetermined frame rate. The display unit 7 displays an image that is recorded as a still image or displays images that are being recorded as moving images.

The display unit 7 notifies, as a notification means, that identification information registered in the identification information management table T1 in the information registering unit 8 is to be renewed when the similarity judging unit 56 judged that a similarity was relatively decreased.

Specifically, the display controlling unit 6 generates screen data of a renewal instruction screen G1 (see FIG. 6B) for instructing a renewal of identification information and outputs the screen data to the display unit 7 so as to display the renewal instruction screen G1. After that, when a user operates the operation inputting unit 10 to instruct a renewal of the identification information, the display controlling unit 6 generates screen data of a renewal operation instruction screen G2 (see FIG. 6C) for instructing whether the identification information will be renewed by a user's operation of the operation inputting unit 10 or the identification information will be renewed automatically and causes the display unit 7 to display the renewal operation instruction screen G2.

When the renewal of identification information by a user's operation of the operation inputting unit 10 (manual renewal) is selected, in a state that the renewal operation instruction screen G2 is displayed on the display unit 7, the display controlling unit 6, as a display controlling means, displays multiple similarities and images of the specific subject contained in images corresponding to the multiple similarities, both of which are stored in the similarity history table T2 in the information registering unit 8, on the display unit 7 such that both of them are related to each other. Specifically, the display controlling unit 6 makes the display unit 7 display predetermined number of similarities and images as the specific region data (face images, for example) of the specific subject corresponding to the similarities for the specific subject ("Mr. A", for example) to be renewed in predetermined order (in date order, for example) such that both of them are related to each other.

The display controlling unit 6 may display all of the predetermined number of similarities and images of the specific subject stored in the display controlling unit 6. Or the display controlling unit 6 may display images only those captured in a predetermined term (two months, for example) from the present time.

In the above example, the notice that identification information is to be renewed is performed by displaying a predetermined renewal instruction screen G1 on the display unit 7. However, the process is an example and the present invention is not limited to that but includes various kinds of variations. That is, the notice that identification information is to be renewed can be performed in any fashion only that it is possible to recognize the renewal timing of the identification information by human's five senses, especially by seeing, hearing and touching. For example, it is possible to notice that identification information is to be renewed can be performed by a sound (voice and the like) or vibration.

The information registering unit 8 stores the identification information management table T1 (see FIG. 2A and FIG. 2C) and the similarity history table T2 (see FIG. 3).

The identification information management table T1 is a table to manage identification information for identifying each of the subjects. Specifically, the identification information management table T1 stores identification information of a specific subject associated with date/time information that relates to a date/time when the identification information is registered in the identification information management table T1.

For example, as shown in FIG. 2A, information "Mr. A" as a name of a specific subject, "identification information A1" (see FIG. 2B) as identification information and "12/24/2008" as registration date/time information are associated with each other in the identification information management table T1. In the same manner, "Mr. B" as a name of a specific subject, "identification information B" as identification information and "2009/7/7" as registration date/time information are associated with each other in the identification information management table T1. Also information "Mr. C" as a name of a specific subject, "identification information C" as identification information and "5/5/2010" as registration date/time information are associated with each other in the identification information management table T1.

The identification information includes, for example, feature information to identify a face of a subject of human or an animal. The feature information may be, for example, face parts such as an eye, nose, mouth and the like, or face image (see FIG. 2B) of human or an animal acquired in predetermined angle. However, the feature information is not limited to them but any information is available so far as it can recognize a face of human or an animal.

In the manner as explained above, the information registering unit 8 registers identification information to identify a specific subject and registration date/time information that relates to a registration date/time of the identification information so as to be associated with each other.

When the first generating unit 57 or the second generating unit 58 newly generated identification information, the information registering unit 8 renews identification information ("identification information A1" of "Mr. A", for example) registered in the identification information management table T1 into the newly generated identification information ("identification information A2", for example, see FIG. 2C). The information registering unit 8 registers a date/time when the identification information was generated by the first generating unit 57 or the second generating unit 58 as a registered date/time in the identification information management table T1 so as to be associated with the identification information.

That is, the information registering unit 8 renews columns corresponding to the identification information and the registering date/time for "Mr. A" as a name of the specific subject in the identification information management table T1 into "identification information A2" as the newly generated identification information (see FIG. 2D) and "6/1/2011" as the newly generated registering date/time information, respectively, as shown in FIG. 2C.

A pickup date/time of an image containing the specific subject may be used as a registration date/time for the registration date/time information.

The identification information management table T1 above explained is an example and not limited to that but the kinds of information stored in the table can be freely selectable.

The similarity history table T2 is a table to manage a history of similarity between a specific region and identification information of a specific subject. Specifically, the similarity history table T2 stores a similarity with regard to a specific region (face region, for example) of a specific subject calculated by the similarity calculating unit 53 and predetermined date/time information so as to be associated with each other. In addition, the similarity history table T2 stores image pickup date/time information related to image pickup date/time of images containing one of the specific subjects, similarities calculated by the similarity calculating unit 53 and specific region data related to specific regions that the similarities are calculated, for all of the specific subjects whose identification information are registered in the identification information management table T1, in total in a time sequence.

For example, as shown in FIG. 3, the similarity history table T2 stores "Mr. A" as a name of a specific subject, "12/24/2008" as image pickup date/time information, 100 (%) as a similarity and "face region data A1" as specific region data such that they are associated with each other. In the same manner, "Mr. A" as the name of the specific subject, "1/1/2009" as the image pickup date/time information, 95(%) as the similarity and "face region data A2" as the specific region data are associated with each other, "Mr. A" as the name of the specific subject, "2/3/2009" as the image pickup date/time information, 65(%) as the similarity and "face region data A3" as the specific region data are associated with each other, "Mr. A" as the name of the specific subject, "3/23/2009" as the image pickup date/time information, 93(%) as the similarity and "face region data A4" as the specific region data are associated with each other, "Mr. A" as the name of the specific subject, "5/5/2009" as the image pickup date/time information, 94(%) as the similarity and "face region data A5" as the specific region data are associated with each other, and "Mr. B" as a name of the specific subject, "7/7/2009" as the image pickup date/time information, 100(%) as the similarity and "face region data B1" as the specific region data are associated with each other in the similarity history table T2.

The similarity history table T2, although a part of the data is omitted, stores "Mr. A" as the name of the specific subject, "1/3/2010" as the image pickup date/time information, 80(%) as the similarity and "face region data An-5" as the specific region data such that they are associated with each other. In the same manner, "Mr. A" as the name of the specific subject, "3/3/2011" as the image pickup date/time information, 73(%) as the similarity and "face region data An-4" as the specific region data are associated with each other, "Mr. A" as the name of the specific subject, "3/5/2011" as the image pickup date/time information, 74(%) as the similarity and "face region data An-3" as the specific region data are associated with each other, "Mr. A" as the name of the specific subject, "5/5/2011" as the image pickup date/time information, 72(%) as the similarity and "face region data An-2" as the specific region data are associated with each other, "Mr. A" as the name of the specific subject, "5/15/2011" as the image pickup date/time information, 71(%) as the similarity and "face region data An-1" as the specific region data are associated with each other, and "Mr. A" as the name of the specific subject, "6/1/2011" as the image pickup date/time information, 68(%) as the similarity and "face region data An" as the specific region data are associated with each other ("n" is an integer) in the similarity history table T2.

In the similarity history table T2, the similarity is stored associated with the pickup date/time of the image containing the specific subject. However, it is possible to use a date/time when the similarity was registered in the similarity history table T2.

The similarity history table T2 above explained is an example and not limited to that but the kinds of information stored in the table can be freely selectable.

In the above embodiment, the similarity and the predetermined date/time information (image pickup date/time information) are associated with each other by using the similarity history table T2. However, it is not necessary to use the similarity history table T2 but any structure is available so far as the similarities and the predetermined date/time information can be stored associated with each other one by one.

In the manner as explained above, the information registering unit 8 stores similarity associated with predetermined date/time information one by one every time the similarity calculating unit 53 calculates the similarity.

The storage medium controlling unit 9 is structured such that a storage medium M is attachable and controls to read data from the attached storage medium M and write data into the storage medium M.

That is, the storage medium controlling unit 9 records an image data for storage, in the storage medium M, that is encoded in a predetermined compression format (JPEG format, for example) by a coding unit (not shown) of the image processing unit 5.

The storage medium M is structured by a nonvolatile memory (flash memory), for example. However, it is not limited to that but any storage medium is applicable.

The operation inputting unit 10 is a unit through which the image pickup device 100 can be operated. Specifically, the operation inputting unit 10 has an operating unit including a shutter button to instruct an image pickup of an subject, selection/instruction button to instruct a selection of an image pickup mode, functions or the like, zoom button to instruct zoom amount and the like (all not shown). The operation inputting unit 10 outputs predetermined signals according to the operation of each button of the operating unit to the central controlling unit 11.

The central controlling unit 11 controls each unit of the image pickup device 100. Specifically, the central controlling unit 11 is provided with a CPU (Central Processing Unit) and the like (not shown) and performs various controlling operations according to various processing programs (not shown) for the image pickup device 100.

Next, the identification information renewal process will be explained with reference to FIGS. 4, 5 and 6A to 6C.

Figure 5:
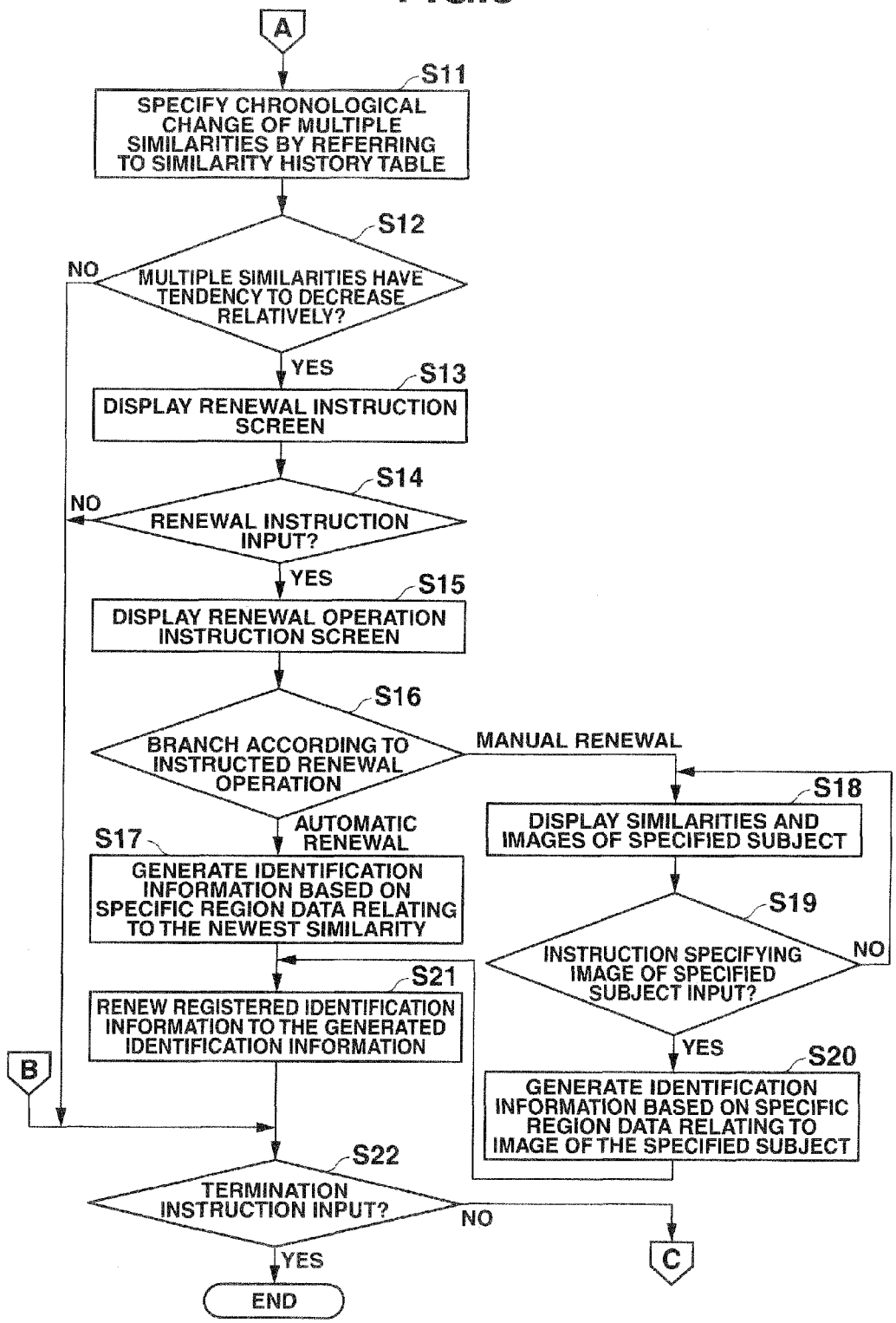
FIG. 5 is a flowchart continued from FIG. 4.
Figure 6A:
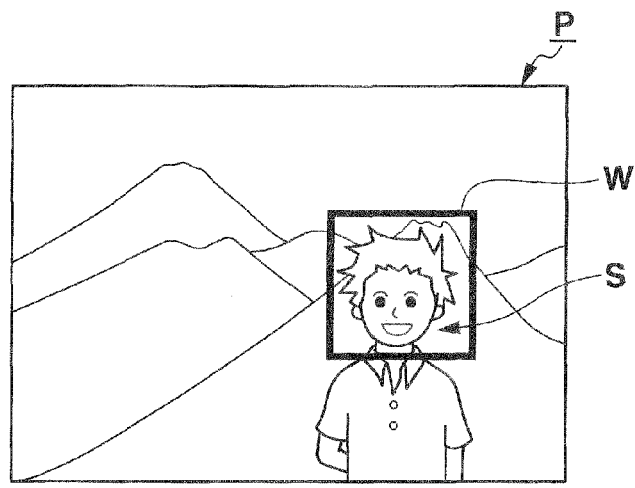
FIGS. 6A to 6C are drawings for explaining of the identification information renewal process explained in FIG. 4.
Figure 6B:
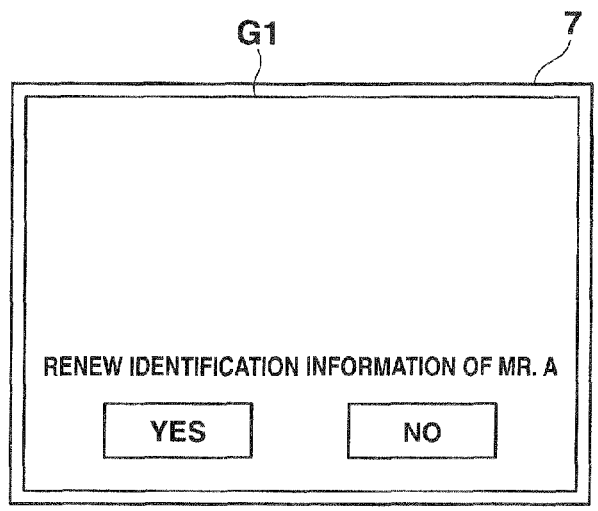
Figure 6C:
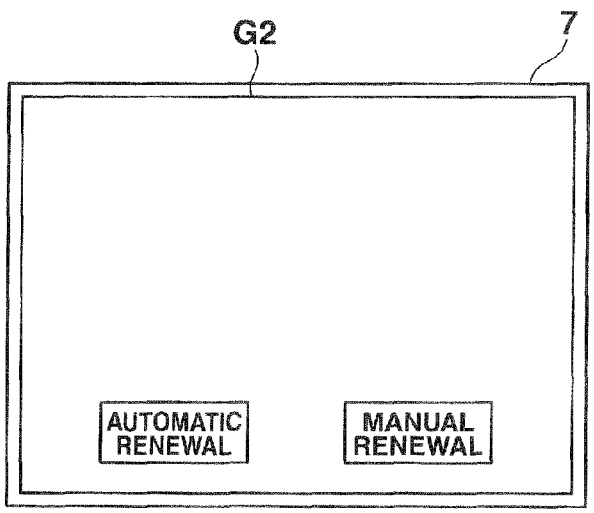
Figure 7:
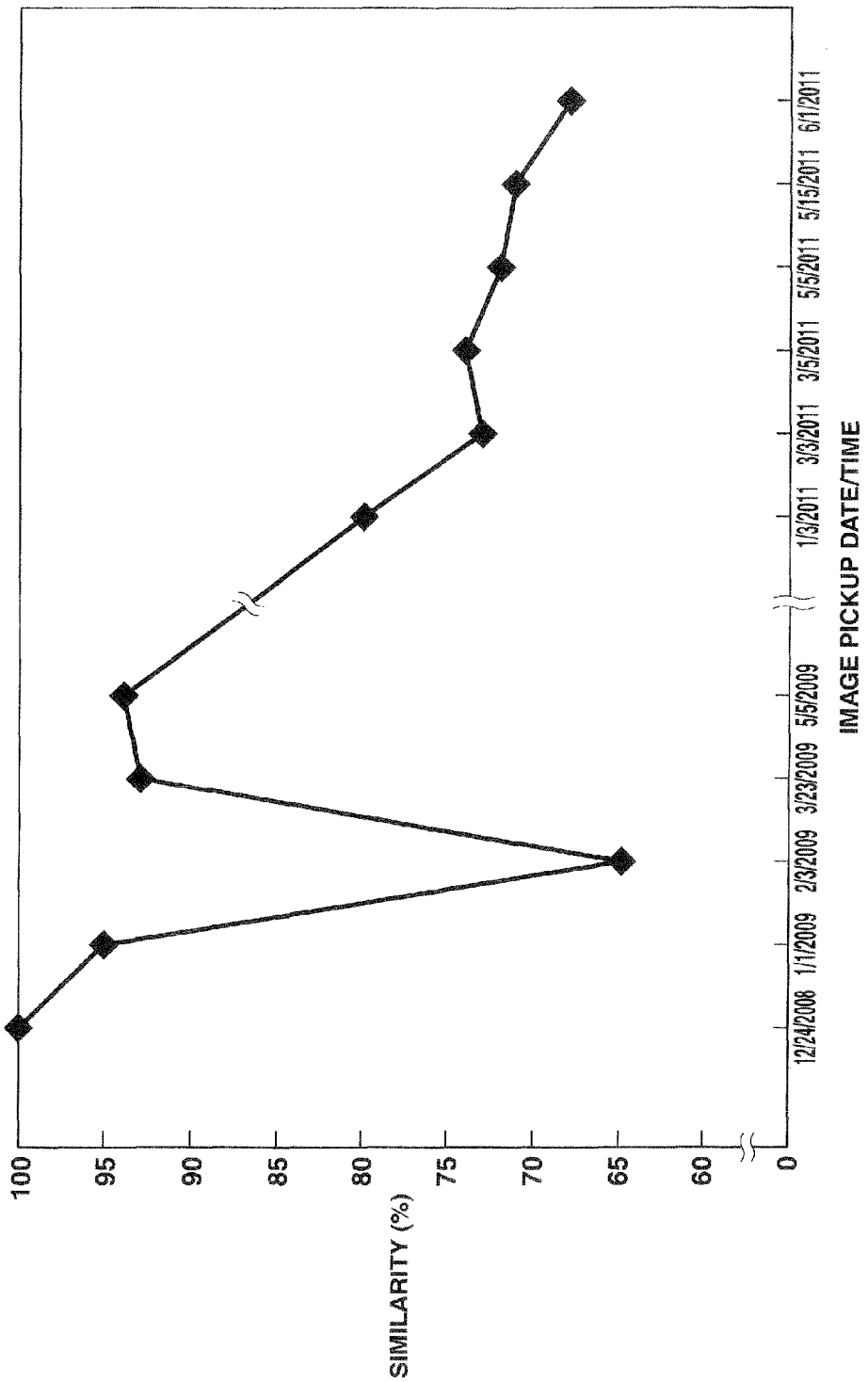
FIG. 7 is a graph for explaining a chronological change of similarity according to the identification information renewal process explained in FIG. 4.

FIG. 4 and FIG. 5 show flowcharts explaining an example of an operation according to the identification information renewal process. FIG. 6A illustrates an example of an image P for storage according to the identification information renewal process. FIGS. 6B and 6C illustrate examples of display screen images according to the identification information renewal process. FIG. 7 is a graph showing a chronological change of similarity with identification information of "Mr. A" as a specific subject.

The identification information renewal process is executed by each unit of the image pickup device 100 under the control of the central controlling unit 11 when an identification information renewal mode is selected and instructed based on a predetermined operation of the selection determination button of the operation inputting unit 10 by a user among multiple operation modes displayed in a menu screen.

It is assumed that the present date/time is Jun. 1, 2011 for explaining the identification information renewal process. It is also assumed that, before execution of the identification information renewal process, "identification information A1" registered on Dec. 24, 2008 as identification information for "Mr. A" as a specific subject is stored in the identification information management table T1. In the same manner "identification information B" registered on Jul. 7, 2009 as identification information for "Mr. B" as a specific subject is stored in the identification information management table T1, and "identification information C" registered on May 5, 2010 as identification information for "Mr. C" as a specific subject is stored in the identification information management table T1.

As shown in FIG. 4, the image pickup controlling unit 2 starts to acquire images of a subject by the image pickup unit 1 (step S1). Specifically, the image pickup controlling unit 2 causes the electronic image pickup unit to convert optical images passed through the lens unit into two dimensional image signals (RGB image data) every predetermined period. The image data generating unit 3 converts the input two dimensional image signals output from the electronic image pickup unit into digital image signals every predetermined period so as to generate YUV data of each frame image. The YUV data of each frame image generated by the image data generating unit 3 are output to the memory 4 and stored in the memory 4.

Next, the image acquiring unit 51 of the image processing unit 5 acquires each of the image data of the frame images of the subject to be processed among the image data of frame images stored in the memory 4 (step S2). Next, the subject detection unit 52 performs a predetermined face detection process to the image data of the frame image acquired by the image acquiring unit 51 and detects a face region S of the subject (human or an animal) from the frame image (step S3, see FIG. 6A).

The subject detection unit 52 judges whether or not the detection of the face region S succeeded (step S4) based on a result of the face detection process. When judged that the process did not succeed in detecting the face region S (step S4: NO), the image processing unit 5 turns the process back to the step S2 and continues the subsequent steps.

When judged that the detection of the face region S succeeded at the step 34 (step S4: YES), the similarity calculating unit 53 calculates a similarity of the subject detected by the subject detection unit 52 by comparing with the identification information in the identification information management table T1 (step S5). Specifically, the similarity calculating unit 53 obtains the identification information of the specific subject from the identification information management table T1. And the similarity calculating unit 53 calculates similarities (in %) based on a predetermined calculation equation by comparing each of the identification information with the face region S of the subject detected by the subject detection unit 52. The similarity calculating unit 53 determines a similarity not less than a predetermined threshold value (60%, for example) and of the largest value among the calculated similarities as the similarity between the subject detected by the subject detection unit 52 and the identification information.

It is assumed that, in this identification information renewal process, the similarity of the "identification information A1" of "Mr. A" shows the best similarity and thus "Mr. A" is identified as the specific subject.

Next, the similarity calculating unit 53 judges whether or not an identification of the specific subject succeeded based on the calculation results of the similarities (step S6). Specifically, the similarity calculating unit 53 judges whether an identification of the specific subject succeeded based on whether or not at least one similarity, among the calculated similarities, is not less than a predetermined threshold value (60%, for example).

When judged that the identification of a specific subject succeeded at step S6 (step S6: YES), the image pickup controlling unit 2 causes the image pickup unit 1 to acquire an image P for storage of the subject based on a predetermined operation of the shutter button of the operation inputting unit 10 by a user (step S7).

Specifically, the image pickup controlling unit 2 controls to adjust image pickup conditions for the subject such that the detected face region. S (face detection frame W, see FIG. 6A, for example) is targeted as an AF area for an auto-focusing process (AF), an AE area for an auto-exposure process (AE) or the like and causes the electronic image pickup unit to capture an optical image of the subject. The image data generating unit 3 generates YUV data of the image P for storage of the subject transferred from the electronic image pickup unit. The YUV data of the image P for storage generated by the image data generating unit 3 is output to the image processing unit 5, encoded by the coding unit of the image processing unit 5 into a predetermined compression format (JPEG format, for example) and stored in the storage medium M under the control of the storage medium controlling unit 9.

On the other hand, when judged that the identification of a specific subject failed at step S6 (step S6: NO), the CPU of the central controlling unit 11 skips steps S7 to S21 and goes to step S22 (see FIG. 5).

The details of the step S22 will be explained later.

After acquiring of the image P for storage of the subject in the step S7, the information registering unit 8 stores the image pickup date/time information ("2011/6/1, for example") relating to the pickup date/time of the image P for storage, the newest similarity ("similarity 68%", for example) calculated by the similarity calculating unit 53 and the specific region data ("face region data An", for example) associated with each other (step S8).

Next, the term judging unit 54 judges whether or not the image P for storage is acquired within a predetermined term from the registration date/time of the identification information (step S9). Specifically, the term judging unit 54 acquires date/time information of the pickup date/time of the image P for storage associated with the newest similarity and stored in the similarity history table T2 and acquires registration date/time information ("12/24/2008", for example) relating to the registration date/time of the identification information of the specific subject ("identification information A1" of "Mr. A", for example) corresponding to the newest similarity from the identification information management table T1. And the term judging unit 54 judges whether or not the image P for storage is captured within a predetermined term (two years, for example) from the registration date/time of the identification information by comparing the pickup date/time of the image P for storage with the registration date/time of the identification information.

If judged that the image P for storage is captured within a predetermined term from the registration date/time of the identification information (step S9: YES), the CPU of the central controlling unit 11 skips steps S10 to S21 and goes to step S22 (see FIG. 5, details will be explained later).

As shown in FIG. 7, for example, even when the similarity decreased to 65% which is below a predetermined judging value, because the image pickup date/time "2/3/2009" is not after a predetermined term from the registration date/time "12/24/2008" of the identification information, it can be judged that the specific subject does not so grow up as to change appearances caused by the lapse of time but the appearances changed exceptionally by some other reasons such as a change of hairstyle. Therefore, it can be judged that it is not necessary to renew the registered identification information at the present time.

On the other hand, when judged that the image P for storage is not captured within a predetermined term from the registration date/time of the identification information (step S9: NO), the threshold value judging unit 55 judges whether or not the newest similarity calculated by the similarity calculating unit 53 is equal to or smaller than a predetermined judging value (70%, for example) (step S10).

When judged that the newest similarity is equal to or smaller than a predetermined judging value (step S10: YES), the similarity judging unit 56, as shown in FIG. 5, specifies chronological change of multiple similarities with reference to the similarity history table T2 (step S11). Specifically, the similarity judging unit 56 acquires pickup date/time information relating to pickup date/time of the images that are associated with the newest similarity and the predetermined number of similarities the date/time of which are nearer to the newest similarity. The similarity judging unit 56 then specifies a tendency of relative change of the multiple similarities by the lapse of pickup date/time as the chronological change of the multiple similarities by comparing a similarity with another similarity the image pickup timing of which is previous by a predetermined number (one, for example) based on the acquired image pickup date/time information.

On the other hand, when judged that the newest similarity is more than a predetermined judging value (step S10: NO), the CPU of the central controlling unit 11 skips steps S11 to S21 and goes to step S22 (see FIG. 5, details will be explained later).

After specifying the chronological change of similarities at the step S11, as shown in FIG. 5, the similarity judging unit 56 judges whether or not the multiple similarities have a tendency to decrease relatively by the lapse of pickup date/time based on the chronological change of similarities (step S12). That is, the similarity judging unit 56 judges whether the multiple similarities have a tendency to decrease relatively by the lapse of pickup date/time for judging whether or not the newest similarity decreased relatively compared with the predetermined number of similarities other than the newest similarity.

Specifically, the similarity judging unit 56 selects the newest similarity (68%, for example) and a predetermined number (three, for example) of similarities (71%, 72% and 74%, for example) that have nearer image pickup date/time to the newest similarity among multiple similarities of "Mr. A" as a specific subject, for example, by referring to the similarity history table T2. And the similarity judging unit 56 judges whether the multiple similarities have the tendency to decrease relatively by judging whether each of the selected similarities decreased compared with the similarity just before the each similarity by the pickup date/time (see FIG. 7).

When judged that the multiple similarities have the relative tendency to decrease as the lapse of the pickup date/time at step S12 (step S12: YES), the display controlling unit 6 generates screen data according to a predetermined renewal instruction screen G1 (see FIG. 6B) for instructing a renewal of the identification information and outputs the screen data to the display unit 7 so as to display the predetermined renewal instruction screen G1 (step S13). The display controlling unit 6 generates, for example, screen data arranging a message to instruct renewal of the identification information of the specific subject to be renewed ("renew identification information of Mr. A", for example) and selectable buttons for instructing performing of renewal ("YES", for example) and non-performing of renewal ("NO", for example) at predetermined positions in the renewal instruction screen G1 and outputs the screen data to the display unit 7.

On the other hand, when judged that the multiple similarities do not have the relative tendency to decrease as the lapse of the pickup date/time at step S12 (step S12: NO), the CPU of the central controlling unit 11 skips steps S13 to S21 and goes to step S22 (details will be explained later).

Next, the CPU of the central controlling unit 11 judges whether or not an identification information renewal instruction was input by a user's predetermined operation of the operation inputting unit 10 (step S14). Specifically, the renewal instruction button ("YES" button, for example) in the renewal instruction screen G1 is selected by a predetermined operation of the operation inputting unit 10 by a user. The CPU of the central controlling unit 11 judges whether the identification information renewal instruction was input or not based on a judgment whether or not an instruction signal output from the operation inputting unit 10 was input.

When judged that the identification information renewal instruction was input at step S14 (step S14: YES), the display controlling unit 6 generates screen data according to a predetermined renewal operation instruction screen G2 (see FIG. 6C) to specify an identification information renewal operation and outputs the screen data to the display unit 7 so as to display the predetermined renewal operation instruction, screen G2 (step S15). For example, the display controlling unit 6 generates screen data in which a button for instruct no an automatic renewal of identification information ("automatic renewal", for example) and a button for instructing a manual renewal of identification information by a predetermined operation of the operation inputting unit 10 by a user ("manual renewal", for example) are arranged at predetermined positions in the renewal operation instruction screen G2 and outputs the screen data to the display unit 7.

On the other hand, When judged that the identification information renewal instruction was not input at step S14 (step S14: NO), the CPU of the central controlling unit 11 skips steps S15 to S21 and goes to step S22 (details will be explained later).

After displaying the renewal operation instruction screen G2 at the step S15 the CPU of the central controlling unit 11 branches the process according to the renewal operation instructed by a user through the predetermined operation of the operation inputting unit 10 (step S16). Specifically, the CPU of the central controlling unit 11 advances the process to step S17 when an automatic renewal of identification information was instructed by a user (step S16: automatic renewal). On the other hand, the CPU of the central controlling unit 11 advances the process to step S19 when a manual renewal of identification information was commanded by a user (step S16: manual renewal).

[Automatic Renewal]

Once an instruction signal output from the operation inputting unit 10 is input to the CPU of the central controlling unit 11, at the step S16, as a result of selecting the button for instructing an automatic renewal ("automatic renewal", for example) in the renewal operation instruction screen G2 by a user's predetermined operation, the CPU judges that an automatic renewal of identification information is instructed by a user (step S16: automatic renewal).

The CPU of the central controlling unit 11 then causes the second generating unit 58 of the image processing unit 5 to generate new identification information with reference to specific region data of a specific subject contained in an image relating to the newest similarity (step S17). Specifically, the second generating unit 58 obtains a specific region data (face region data An, for example) that is stored associated with the newest similarity of the specific subject ("Mr. A", for example) from the similarity history table T2 in the information registering unit 8 and specifies the specific region data as identification information ("identification information A2", for example).

After that the CPU of the central controlling unit 11 advances the process to step S21 (details will be explained later).

[Manual Renewal]

Once an instruction signal output from the operation inputting unit 10 is input to the CPU of the central controlling unit 11, at the step S16, as a result of selecting the button for instructing a manual renewal ("manual renewal", for example) in the renewal operation instruction screen G2 by a user's predetermined operation, the CPU judges that a manual renewal of identification information is instructed by a user (step S16: manual renewal).

The CPU of the central controlling unit 11 then causes the display controlling unit 6 to refer to the similarity history table T2 in the information registering unit 8. The display controlling unit 6 displays the predetermined number of similarities and the images of the specific region of the specific subject to be renewed ("Mr. A", for example) stored in the similarity history table T2 on the display unit 7 such that they are associated with each other (step S18).

Next, the CPU of the central controlling unit 11 judges whether or not an instruction to specify an image of the specific subject among the predetermined number of images displayed on the display unit 7 based on the predetermined operation of the operation inputting unit 10 by a user (step S19).

When it is judged that an instruction to specify an image of the specific subject is not input (step S19: NO), the CPU of the central controlling unit 11 returns the process to step S18 and executes subsequent processing until it is judged that an instruction to specify an image of the specific subject is input (step S19: YES).

When it is judged that, at step S19, an instruction to specify an image of the specific subject is input (step S19: YES), the CPU of the central controlling unit 11 causes the first generating unit 57 of the image processing unit 5 to generate new identification information based on the specific region data corresponding to the image of the specific subject specified by a user (step S20). Specifically, the first generating unit 57 obtains specific region data (face region data An, for example) corresponding to the image of the specific subject from the similarity history table T2 in the information registering unit 8. The first generating unit 57 defines the specific region data as the identification information ("identification information A2", for example).

After that the CPU of the central controlling unit 11 advances the process to step S21 (details will be explained later).

The information registering unit 8 renews, at step S21, identification information registered in the identification information management table T1 to the identification information newly generated by the first generating unit 57 or the second generating unit 58 (step S21).

Specifically, the information registering unit 8 renews (replaces) identification information ("identification information A1" of "Mr. A", for example) registered in the identification information management table T1 with the newly generated identification information ("identification information A2", for example) having a registration date/time that is a date/time the new identification information is generated by the first generating unit 57 or the second generating unit 58 (see FIG. 2C).

Next, the CPU of the central controlling unit 11 judges whether or not a termination instruction of identification information renewal process is input based on a predetermined operation of the operation inputting unit 10 by a user (step S22).

When judged that the termination instruction is not input (step S22: NO), the CPU of the central controlling unit 11 returns the process to step S2 (see FIG. 4) and executes subsequent steps.

On the other hand, when judged that the termination instruction is input (step S22: YES), the CPU of the central controlling unit 11 terminates the identification information renewal process.

The imaging device 100 according to an exemplary embodiment calculates a similarity between information of a subject detected in an image obtained by the image pickup unit 1 and identification information ("identification information A1", for example) to identify a specific subject (face of human or an animal, for example). The imaging device 100 stores the calculated similarity every time the similarity is calculated such that the similarity and predetermined date/time information are associated with each other. In addition, when judged that the newly calculated similarity relatively decreased with respect to predetermined number of similarities based on a chronological change of the multiple similarities, the imaging device 100 notifies that registered identification information is to be renewed. Therefore, a user can recognize a concern that proper identification of a specific subject may become difficult due to chronological changes of appearances by growth of the subject. And it will become possible to identify the specific subject properly by renewing (replacing) the registered identification information with the new identification information ("identification information A2", for example) and use the new identification information.

Specifically, the display unit 7 displays a predetermined screen for selecting whether identification information is to be renewed based on a predetermined operation of the operation inputting unit 10 by a user or renewed automatically. A user can select the way of the renewal operation by the operation of the operation inputting unit 10 as the user desires.

In a case where identification information is renewed by a predetermined operation of the operation inputting unit 10 by a user, multiple similarities and images of a specific subject contained in images relating to the similarities are displayed on the display unit 7 so as to be associated with each other and the image pickup device 100 newly generates identification information ("identification information A2", for example) based on an image selected by the user by the predetermined operation of the operation inputting unit. Therefore, the image pickup device 100 of an exemplary embodiment can generate new identification information based on the image of the subject the user desires and replace registered identification information ("identification information A1", for example) with the new identification information.

In a case where identification information is renewed automatically, the image pickup device 100 newly generates identification information to identify the specific subject based on an image of the subject contained in an image relating to a similarity that was judged to be decreased relatively compared with predetermined number of other similarities. Therefore, the image pickup device 100 of an exemplary embodiment can generate new identification information ("identification information A2", for example) based on an image of the specific subject, which is most similar to the present specific subject and least similar to registered identification information ("identification information A1", for example), relating to the newest similarity and renew (replace) the registered identification information with the new identification information.

In an embodiment, the image pickup device 100 can specify chronological change of the multiple similarities based on pickup date/time information relating to pickup date/time of the captured images and judge properly whether or not the newly calculated similarity is relatively decreased based on the chronological change of the multiple similarities. Specifically, the image pickup device 100 can specify a tendency of relative change of the multiple similarities with a progress of the image pickup date/time as the chronological change of the multiple similarities and can judge properly whether or not the similarity is relatively decreased by judging whether or not the multiple similarities have the tendency of relative decrease.

It is possible to judge whether or not the multiple similarities have the tendency of relative decrease by judging whether each of the newly calculated similarity and predetermined number of similarities having nearer image pickup date/time to the calculated similarity was decreased or not compared with the just previous similarity. Or it is possible to judge whether or not the multiple similarities have the tendency of relative decrease by judging whether the newly calculated similarity was decreased compared with the similarity of the just previous image pickup date/time and each of specified number of similarities among predetermined number of similarities having nearer image pickup date/time to the new similarity was decreased compared with the just previous similarity.

Therefore, it becomes possible to determine properly the renewal timing of registered identification information, which is a timing of notification that the registered identification information is to be renewed, by considering chronological change of appearances of the subject.

When judged that the newly calculated similarity is equal to or smaller than a predetermined judgment value, the image pickup device 100 judges whether or not the similarity was relatively decreased compared with the predetermined number of other similarities. Thus when the similarity to the registered identification information is sufficiently high, it is not necessary to renew the registered identification information. And the number of processes to judge whether or not the similarity was relatively decreased, which are carried out to determine the timing to inform that the registered identification information is to be renewed, can be reduced.

In an embodiment, the image pickup device 100 judges whether or not the newly calculated similarity was relatively decreased compared with the predetermined number of other similarities when judged that the image relating to the newly calculated similarity was not captured within a predetermined period from the registered date/time of the identification information. In a case where the image is not captured within the predetermined period from the registered date/time of the identification information, the decrease of similarity will be attributed to some exceptional reasons such as a changed coiffure, for example, instead of chronological change by growth and thus the similarity between the image and the registered identification information can be still considered to be sufficiently high. As a result, it can be supposed that it is not necessary to renew the registered identification information and thus the number of processes to judge whether or not the similarity was relatively decreased, which are carried out to determine the timing to inform that the registered identification information is to be renewed, can be reduced.

The present invention is not limited to an exemplary embodiment above explained but various kinds of improvements and modifications are applicable within the gist of the invention.

For example, in the identification information renewal process of the above exemplary embodiment, the threshold value judging unit 55 judges whether the new similarity relating to an image P for storage is equal to smaller than a predetermined judgment value after the term judging unit 54 judged whether the image P for storage was captured within a predetermined period from the registering date/time of the identification information. However, the sequence of the judgment steps is not limited to the example. That is, as to the sequence of the judgment steps, the judgment step by the threshold value judging unit 55 may be carried out prior to the judgment step by the term judging unit 54.

An exemplary embodiment above explained includes the step to judge whether or not the newly calculated similarity is equal to or smaller than a predetermined judgment value. However, it is optional to include the step. That is, the image pickup device 100 does not necessarily include the threshold value judging unit 55 but any structure is applicable as far as it can judge whether or not a new similarity is relatively decreased compared with predetermined number of other similarities.

An exemplary embodiment above explained includes the step to judge whether or not the image relating to the newly calculated similarity is captured within predetermined period from the registration date/time of the identification information. However, the step is also optional. That is, the image pickup device 100 does not necessarily include the term judging unit 54 but any structure is applicable as far as it can judge whether or not a new similarity is relatively decreased compared with predetermined number of other similarities.

In an exemplary embodiment above explained, the notification that the registered identification information is to be renewed is notified when judged that a newly calculated similarity was relatively decreased compared with a predetermined number of other similarities. However, the image pickup device 100 may generate new identification information to identify a specific subject and renew the registered identification information automatically without notifying the notice.

The structure of the image pickup device 100 above explained is an example and not limited to the example. The image pickup device 100 is exemplified as an image processing device; however, it is not limited to the example but any structure may be applicable as far as it is possible to process images according to the present invention. It will be possible, for example, to apply the present invention to a crime prevention system (surveillance system) for which an image pickup device (not shown) that is structured independently from an image processing device s provided at an entrance (gateway, for example) or a corridor, image data generated by the image pickup device is transmitted to the image processing device and the image processing device identifies a passenger (specified person) based on the image data.

The functions of the above exemplary embodiment are performed by the image processing unit 5, display unit 7 and information registering unit 8 under the control of the central controlling unit 11. However, it is not restrictive but it is possible to structure an embodiment such that the central controlling unit 11 performs the functions by executing predetermined programs.

Specifically, a program including an acquiring routine, calculating routine, memory controlling routine, first judging routine and notification controlling routine is stored in the program memory (not shown). And the acquiring routine may cause the CPU of the central controlling unit 11 to function as an image acquiring means. In the same manner, the calculating routine may cause the CPU of the central controlling unit 11 to function as a calculating means to calculate similarity between subject information contained in the image acquired by the acquiring means and identification information registered in the registering means. The memory controlling routine may cause the CPU of the central controlling unit 11 to function as a memory controlling means to store the similarity, every time it is calculated, such that the similarity is associated with predetermined date/time information. The first judging routine may cause the CPU of the central controlling unit 11 to function so as to judge whether the similarity newly calculated by the calculating means was relatively decreased or not compared with predetermined number of other similarities based on a chronological change of multiple similarities stored in the memory controlling means. The notification controlling routine may cause the CPU of the central controlling unit 11 to function so as to notify, in a case where it was judged that the similarity was relatively decreased, that the identification information registered in the registering means is to be renewed.

It will become possible by the embodiment, even when the image pickup device 100 is replaced with a new one, the same functions can be retained by rewriting the program and the tables 11, 12 and the like registered in the information registering unit 8, that is, by transferring various data and functions.

A nonvolatile memory such as a flash memory or a portable record memory such as a CD-ROM as well as a ROM or a hard disc may be used as a computer readable medium for a program to carry out the processes above explained. Furthermore, carrier wave may be used as a medium for providing program data through a predetermined communication line.

It should be noted that the scope of the present invention is not limited to the exemplary embodiments above explained but includes the scope of the original claims as well as the present claims and equivalents thereof.

The entire disclosure of Japanese Patent Application No. 2011-211967 filed on Sep. 28, 2011 including specification, claims, drawings and summary is incorporated herein by reference in its entirety.

What is claimed is:

1. An image processing device comprising:
an acquiring unit that acquires an image;
a calculating unit that calculates a degree of similarity between information of a specific subject contained in the image acquired by the acquiring unit and identification information of the specific subject registered in a registering unit;
a memory controlling unit that controls a memory unit to store the calculated degree of similarity such that the degree of similarity is associated with date/time information;
a first judging unit that judges whether or not the calculated degree of similarity is relatively low compared with predetermined number of other degrees of similarity based on a chronological change of the degrees of similarity; and
a notification unit that notifies that the identification information registered in the registering unit is to be renewed when judged, by the first judging unit, that the calculated degree of similarity is relatively low.

2. The image processing device according to claim 1, wherein the memory controlling unit controls the memory unit, every time the degree of similarity is calculated by the calculating unit, to store the calculated degree of similarity such that the calculated degree of similarity is associated with date/time information.

3. The image processing device according to claim 1, wherein the registering unit registers the identification information of the specific subject and information relating to registration date/time of the identification information such that both of the information are associated with each other.

4. The image processing device according to claim 1, further comprising a specifying unit that specifies the chronological change of the degrees of similarity based on information relating to image pickup date/time stored in the memory unit, wherein;
the memory controlling unit causes the memory unit to store the degree of similarity of the image and the information relating to image pickup date/time of the image so as to be associated with each other, and
the first judging unit judges whether or not the calculated degree of similarity is relatively low based on the chronological change specified by the specifying unit.

5. The image processing device according to claim 3, wherein;
the specifying unit specifies, as the chronological change, a tendency of a relative change of the degrees of similarity in accordance with a progress of the image pickup date/time, and
the first judging unit further judges whether or not the degree of similarity is relatively low based on whether or not the degrees of similarity have the relative tendency to decrease.

6. The image processing device according to claim 4, wherein the first judging unit judges whether or not the degrees of similarity have the relative tendency to decrease based on whether or not each of the calculated degree of similarity is lower than each previous degree of similarity.

7. The image processing device according to claim 4, wherein the first judging unit judges whether or not the degrees of similarity have the relative tendency to decrease based on whether the calculated degree of similarity is lower than the degree of similarity having a previous image pickup date/time and each of specific number of degrees of similarity among predetermined number of degrees of similarity is lower than each previous degree of similarity.

8. The image processing device according to claim 1, further comprising a second judging unit that judges whether or not the degree of similarity calculated by the calculating unit is equal to or smaller than a predetermined judging value, wherein;
the first judging unit judges whether or not the degree of similarity is relatively low when it is judged by the second judging unit that the degree of similarity is equal to or smaller than the predetermined judging value.

9. The image processing device according to claim 1, further comprising a third judging unit that judges whether the image relating to the degree of similarity calculated by the calculating unit is captured within a predetermined term from a registration date/time of a first information based on the date/time information associated with the degree of similarity, wherein
the first judging unit judges whether or not the degree of similarity is relatively low when it is judged by the third judging unit, that the image is not captured within the predetermined term.

10. The image processing device according to claim 1, wherein the notification unit comprises a display unit that displays a predetermined screen for specifying whether a first information is renewed by a predetermined operation of an operating unit by a user or renewed automatically.

11. The image processing device according to claim 1, further comprising:
a display controlling unit that controls a display unit so as to display, when a first information is renewed by a predetermined operation of an operating unit by a user, the degrees of similarity stored in the memory unit and images of the specific subject contained in the images relating to the degrees of similarity so as to be associated with each other on the display unit; and
a first generating unit that generates new identification information for identifying the specific subject based on an image of the specific subject selected by the predetermined operation of the operating unit by the user among the displayed degrees of similarity and images of the specific subject associated with each other on the display unit, wherein;
the registering unit registers a generating date/time of the identification information generated by the first generating unit, as a registering date/time, associated with the identification information.

12. The image processing device according to claim 1, further comprising a second generating unit that generates new identification information for identifying the specific subject, when the identification information is automatically renewed, based on an image of the specific subject contained in the image relating to the degree of similarity which is judged to be relatively low by the first judging unit, wherein;

the registering unit registers a generating date/time of the identification information generated by the second generating unit, as a registering date/time, in association with the identification information.

13. The image processing device according to claim 1, further comprising a detecting unit that detects a subject contained in the image acquired by the acquiring unit, wherein;

the calculating unit calculates a degree of similarity between the detected subject in the image and the identification information.

14. The image processing device according to claim 1, wherein the specific subject is a face of at least one of human and an animal.

15. The image processing device according to claim 1, further comprising an image pickup unit that captures an image of the subject, wherein;

the acquiring unit acquires the image captured by the image pickup unit.

16. An image processing method utilizing an image processing device, comprising:

acquiring an image;

calculating a degree of similarity between information of a specific subject contained in the acquired image and identification information of the specific subject registered in a registering unit;

storing the calculated degree of similarity in a memory unit such that the degree of similarity is associated with, date/time information;

judging, based on a chronological change of degrees of similarity, whether or not the calculated degree of similarity is relatively low compared with predetermined number of degrees of similarity other than the calculated degree of similarity; and notifying that the identification information registered in the registering unit is to be renewed when the calculated degree of similarity is judged to be relatively low.

17. A Non-transitory computer readable program storage medium that stores a program, the program comprising: operational instructions that cause the computer to acquire an image; operational instructions that cause the computer to calculate a degree of similarity between information of a specific subject contained in the acquired image and identification information of the specific subject registered in a registering unit; operational instructions that cause the computer to store the calculated degree of similarity in a memory unit such that the degree of similarity is associated with date/time information; operational instructions that cause the computer to judge, based on a chronological change of degrees of similarity, whether or not the calculated degree of similarity is relatively low compared with predetermined number of degrees of similarity other than the calculated degree of similarity; and operational instructions that cause the computer to notify that the identification information registered in the registering unit is to be renewed when the calculated degree of similarity is judged to be relatively low.

* * * * *

UNITED STATES PATENT AND TRADEMARK OFFICE
CERTIFICATE OF CORRECTION

| | | |
|---|---|---|
| PATENT NO. | : 8,989,504 B2 | Page 1 of 1 |
| APPLICATION NO. | : 13/615338 | |
| DATED | : March 24, 2015 | |
| INVENTOR(S) | : Shigeto Suzuki | |

It is certified that error appears in the above-identified patent and that said Letters Patent is hereby corrected as shown below:

In the Claims

Column 22, Claim 9, Line 10, delete "unit," and insert --unit--.

Column 24, Claim 16, Line 2, delete "with," and insert --with--.

Column 24, Claim 17, Line 1, delete "Non-transitory" and insert --non-transitory--.

Signed and Sealed this
Sixth Day of October, 2015

Michelle K. Lee
*Director of the United States Patent and Trademark Office*